(12) United States Patent
Huang et al.

(10) Patent No.: US 7,409,979 B2
(45) Date of Patent: Aug. 12, 2008

(54) ATTACHING APPARATUS FOR OPTICAL FILMS

(75) Inventors: Chung-Sung Huang, Miao-Li (TW); Xu Lu, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 515 days.

(21) Appl. No.: 11/074,465

(22) Filed: Mar. 7, 2005

(65) Prior Publication Data

US 2005/0206816 A1    Sep. 22, 2005

(30) Foreign Application Priority Data

Mar. 5, 2004    (TW) .............................. 93105803 A

(51) Int. Cl.
    *B32B 37/00*    (2006.01)
(52) U.S. Cl. .................. 156/538; 156/556; 156/579; 156/580; 156/581
(58) Field of Classification Search .............. 156/538, 156/556, 579, 580, 581, 583.1, 228, 285; 269/21, 37, 45
    See application file for complete search history.

(56) References Cited

U.S. PATENT DOCUMENTS

| 5,098,508 | A | * | 3/1992 | Mattil ........................ 156/363 |
| 6,773,537 | B2 | * | 8/2004 | Erickson et al. ............. 156/250 |
| 6,868,884 | B2 | * | 3/2005 | Briese ........................ 156/358 |

* cited by examiner

*Primary Examiner*—James Sells
(74) *Attorney, Agent, or Firm*—Wei Te Chung

(57) ABSTRACT

An attaching apparatus (10) includes a guiding bracket (30), a pivot bracket (40), and a sliding bracket (50). The guiding bracket includes a supporting plate (312), and a first table (32) defining a first space (322). The pivot bracket includes a pivot device having a connecting plate (42) and a pivoting plate, the pivoting plate is pivotably connected to the connecting plate. The sliding bracket slidably engages with the guiding bracket. The first table is movably positioned on the supporting plate. The first table under the first space defines one or more suction holes. The pivoting plate includes a second table (430), and two locators (440, 450) movably positioned on the second table. The second table defines one or more suction holes (434). The attaching apparatus can be readily adjusted to attach LCD panels and polarizers of various different sizes.

19 Claims, 5 Drawing Sheets

ATTACHING APPARATUS FOR OPTICAL FILMS

BACKGROUND OF THE INVENTION

1. Technical Field

The present invention relates to an attaching apparatus for optical films, and particularly to an attaching apparatus used to attach a polarizer onto a liquid crystal display (LCD) panel.

2. General Background

A process of fabricating an LCD generally comprises attaching two polarizers onto two opposite surfaces of an LCD panel. To attach the polarizers onto the LCD panel in mass production, an attaching apparatus is necessary.

Typical attaching apparatuses are each limited to a specific-sized polarizer and a specific-sized LCD panel. The attaching apparatus generally comprises a polarizer aligning device used to align the polarizer with the LCD panel.

Referring to FIG. 5 and FIG. 6, these represent a conventional polarizer aligning device as disclosed in Taiwan Patent No. 478,434 issued on Mar. 1, 2002. The polarizer aligning device 60 comprises a flat plate 62, and a plurality of locators 61 protruding from two adjacent sides of the flat plate 62. Each locator 61 has two orthogonal portions. Each locator 61 and the flat plate 62 form an elongate space 610 having an elongate opening nearest to a middle of the polarizer aligning device 60. A height H of the space 610 is equal to a thickness of the LCD panel. A width W of the space 610 is equal to a distance between the corresponding sides of the overlapped polarizer and LCD panel.

In use, the LCD panel is placed on the flat plate 62, and two adjacent sides of the LCD panel are insert into the spaces 610. The polarizer is placed on the LCD panel and overlaps most of the LCD panel. Two adjacent sides of the polarizer are adjusted to abut against the parts of each locator 61 above the space 610. Thus, the polarizer is aligned with the LCD panel.

However, each locator 61 typically is immovable. If the locator 61 becomes distorted, the only way to repair it is by forcing it back into position, such as by hammering it. In addition, when the locator 61 becomes worn out, the polarizer aligning device 60 may not be able to accurately align the polarizer with the LCD panel, and typically must be replaced.

What is needed, therefore, is an attaching apparatus for an optical film which is adjustable.

SUMMARY

An attaching apparatus comprises a base, a guiding bracket, a pivot bracket, and a sliding bracket. The guiding bracket is positioned on the base and comprises a first table and a supporting plate. The first table defines a first space and a second space communicating with each other. The first table is movably positioned on the supporting plate. The first table under the first space defines one or more suction holes. The pivot bracket comprises a support frame and a pivot device. The support frame is positioned on the base near the guiding bracket. The pivot device comprises a connecting plate and a pivoting plate, the connecting plate is slantingly positioned on the support frame, the pivoting plate is pivotably connected to the connecting plate and comprises a second table and two locators movably positioned on the second table. The second table defines one or more suction holes. The sliding bracket slidably engages with the guiding bracket. The attaching apparatus can be readily adjusted to attach LCD panels and polarizers of various different sizes.

Other objects, advantages, and novel features of the present invention will become more apparent from the following detailed description of a preferred embodiment thereof when taken in conjunction with the accompanying drawings, in which:

DETAILED DESCRIPTION OF THE EMBODIMENT

Reference will now be made to the drawings to describe a preferred embodiment of the present invention in detail.

Figure 1:
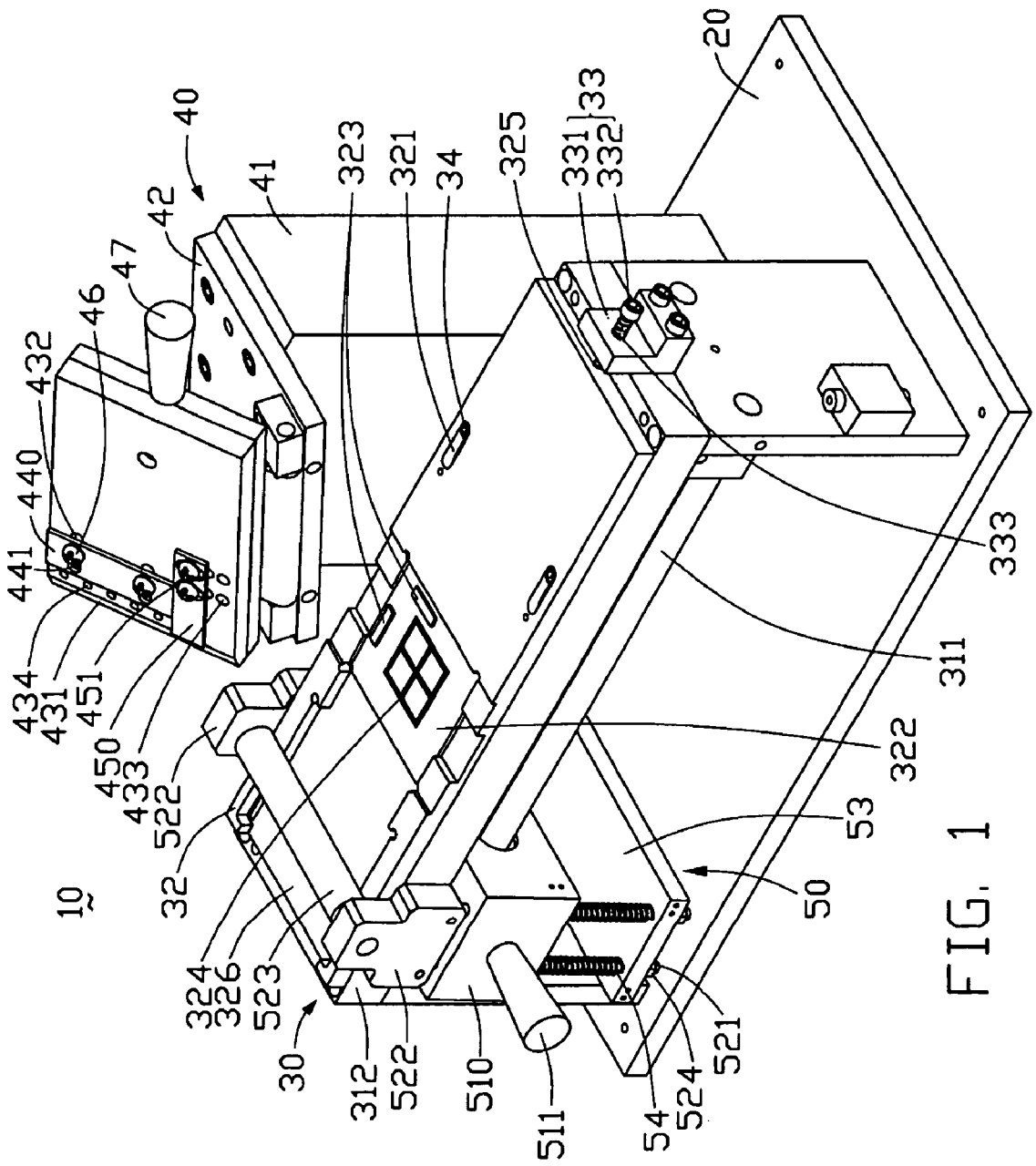
FIG. 1 is an isometric view of an attaching apparatus according to a preferred embodiment of the present invention, the attaching apparatus comprising a pivoting plate.

Referring to FIG. 1, an attaching apparatus 10 in accordance with a preferred embodiment of the present invention comprises a base plate 20, a guiding bracket 30, a pivot bracket 40, and a sliding bracket 50. The base plate 20 is rectangular, and the guiding bracket 30 and the pivot bracket 40 are set thereon. The pivot bracket 40 is placed near a back of the guiding bracket 30. The sliding bracket 50 engages with the guiding bracket 30 and can slide thereon.

The guiding bracket 30 comprises a frame (not labeled), a first table 32, and an adjusting device 33. The frame comprises a supporting plate 312, and a pair of parallel guide rods 311 positioned below the supporting plate 312. The first table 32 has two transverse slots 321 corresponding to two screw holes (not shown) of the supporting plate 312, respectively. The first table 32 is fixed on the supporting plate 312 by two screws 34 extending down through the two slots 321 and engaging in the two screw holes of the supporting plate 312, respectively.

The first table 32 comprises a first space 322 defined in a central portion thereof, and a second space 326 defined in a left portion thereof. The second space 326 communicates with the first space 322. A portion of the first table 32 below the first space 322 has a grid of grooves 324 crossing and communicating each other. Each intersection of the grooves 324 communicates with a respective suction hole (not shown) of the first table 32. Two locators 323 are placed adjacent two sides of the grid of grooves 324, respectively. The second space 326 is deeper than the first space 322, therefore walls of the first table 32 defining the second space 326 are higher than walls of the first table 32 defining the first space 322. The adjusting device 33 is positioned at a right end of the guiding bracket 30, and comprises a fixed block 331 with a screw hole 333. A screw 332 can be engaged in the screw hole 333 and a screw hole 325 at the right end of the first table 32, whereby the first table 32 can be moved relative to the supporting plate 312.

Figure 2:
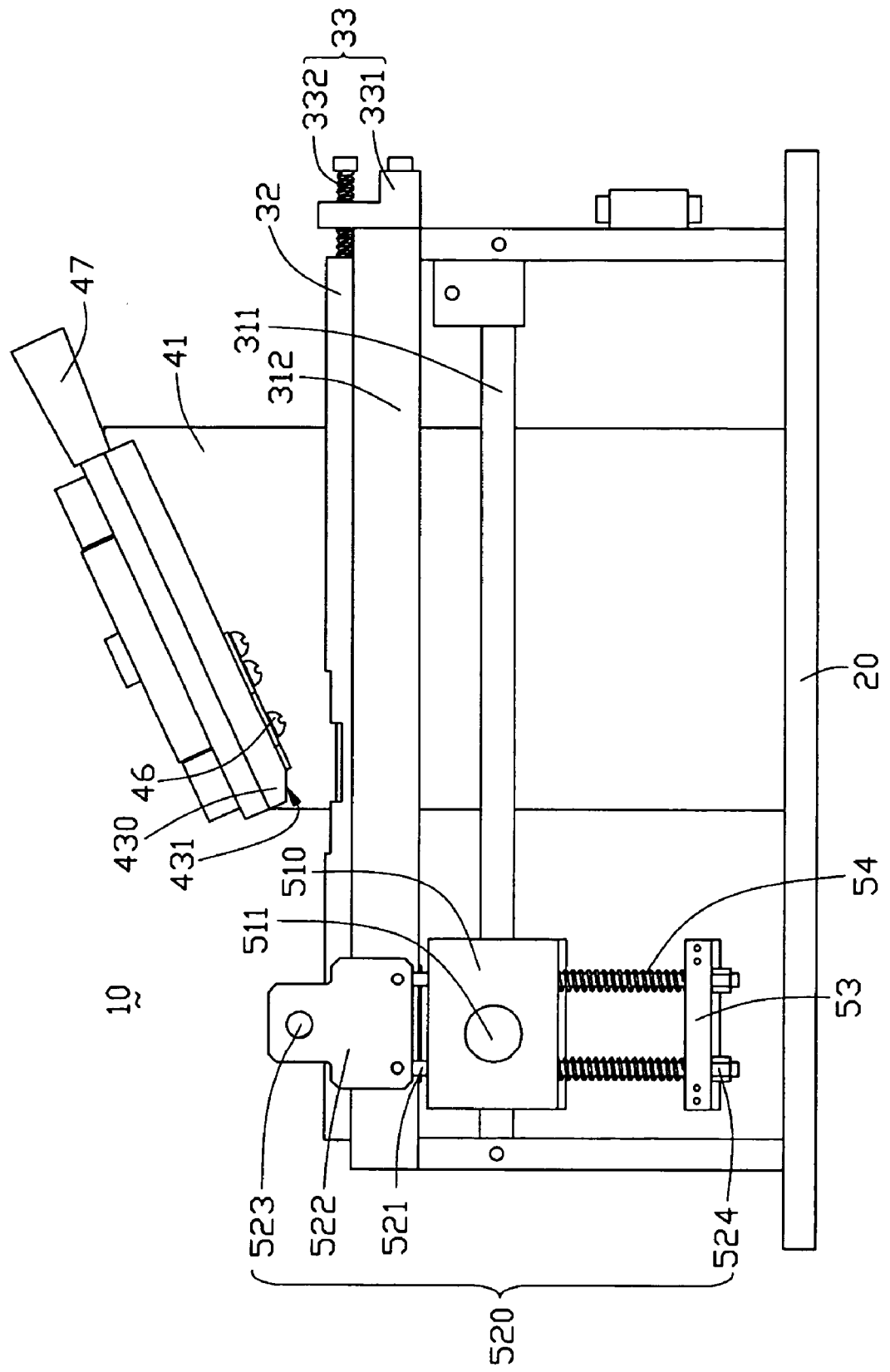
FIG. 2 is a side plan elevation of the attaching apparatus of FIG. 1, showing the pivoting plate in a different position.

Also referring to FIG. 2, the pivot bracket 40 comprises a support frame 41, a connecting plate 42, and a pivoting plate (not labeled). The support frame 41 stands on the base plate 20 near a back of the guiding bracket 30, and has a slanted top surface. The connecting plate 42 is secured on the slanted top surface of the support frame 41. The pivoting plate is rotatable fixed with connecting plate 42, and comprises a second table 430, a first locator 440, a second locator 450, and a handle 47.

Two parallel rows of first screw holes 432 and two parallel rows of second screw holes 433 are defined in the second table 430. The rows of first screw holes 432 are perpendicular to the rows of second screw holes 433. A plurality of aligned suction holes 434 is formed at the left of the first screw holes 432. The first locator 440 and the second locator 450 have slots 441 and 451, respectively, and are attached on the second table 430 by screws 46. The handle 47 is set at a right end of the second table 430. The second table 430 is pivotably connected to the connecting plate 42. The second table 430 comprises a sloped guiding surface 431 at a left end thereof. When the second table 430 is pivoted to the position shown in FIG. 2, the guiding surface 431 is parallel and close to the first table 32.

The sliding bracket 50 comprises a slider 510, a connecting device 520, an adjusting plate 53, and a plurality of springs 54. The slider 510 defines horizontal through holes (not labeled), and vertical through holes (not labeled). The horizontal through holes movably receive the guide rods 311 of the guiding bracket 30. A handle 511 is fixed on a front of the slider 510. The connecting device 520 comprises a roller 523, two connecting blocks 522, and a plurality of connecting poles 521 with screw threads at bottom ends thereof. The roller 523 is rotatably engaged with the connecting blocks 522. Upper ends of the connecting poles 521 are fixed in the connecting blocks 522, and the other portions of the connecting poles 521 extend through the slider 510, the springs 54 and holes of the adjusting plate 53 in that order. A plurality of nuts 524 are engaged on the screw threads of the bottom ends of the connecting poles 521, respectively. The springs 54 are compressed between the slider 510 and the adjusting plate 53.

Figure 3:
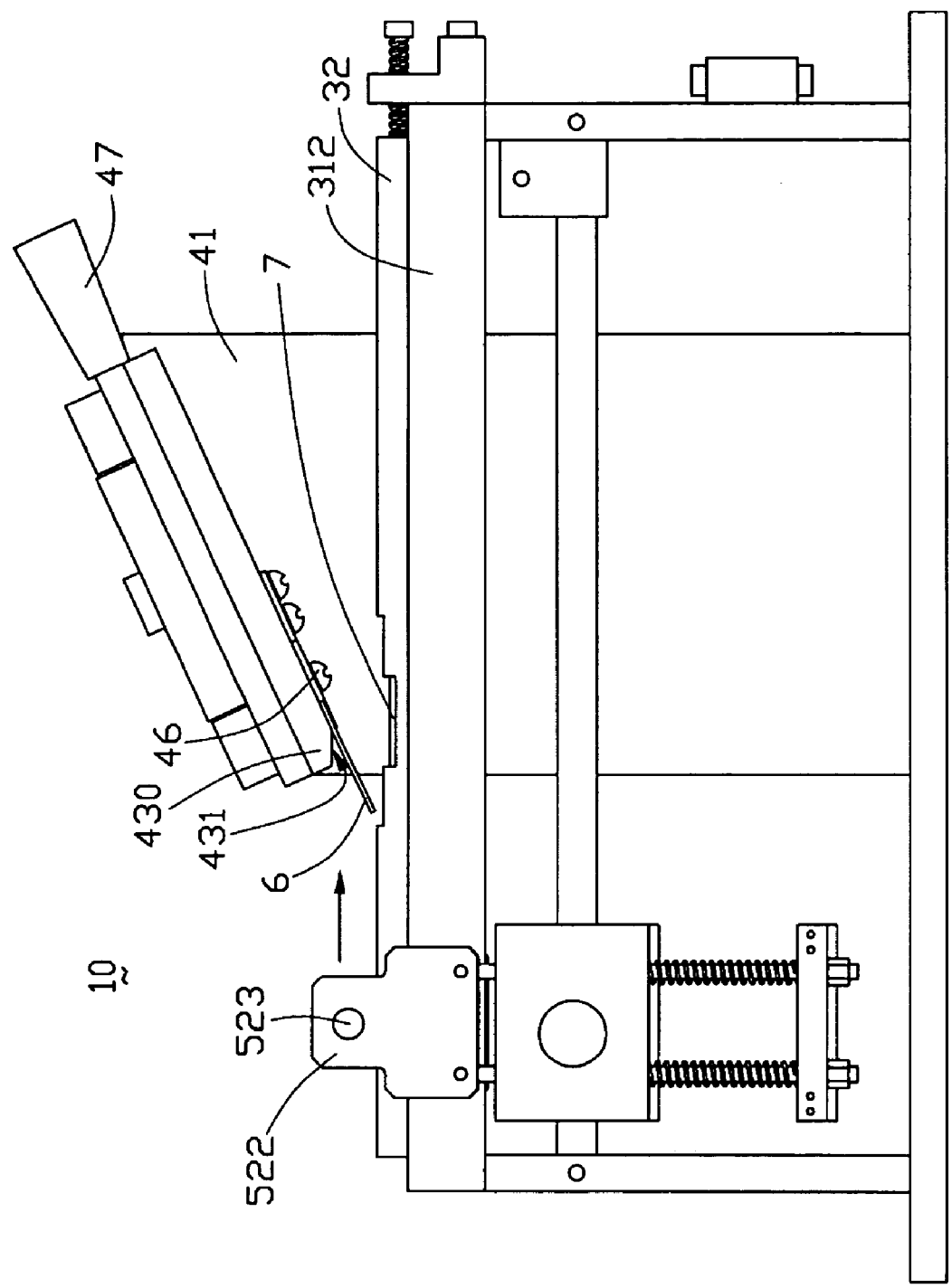
FIG. 3 is similar to FIG. 2, but showing a polarizer engaged on the pivoting plate and an LCD panel engaged on a first table of the attaching apparatus.
Figure 4:
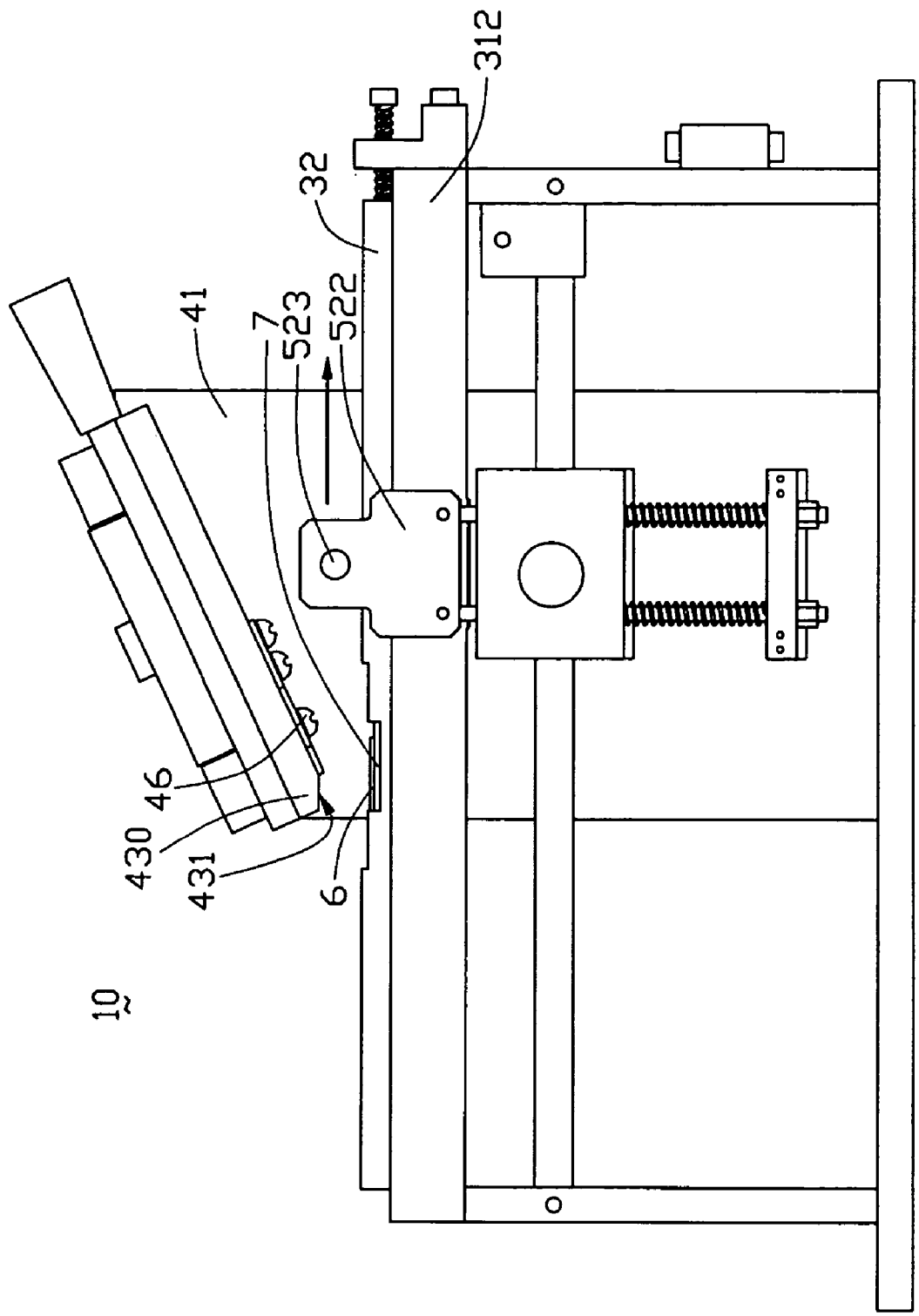
FIG. 4 is similar to FIG. 3, but showing the polarizer attached to the LCD panel.
Figure 5:
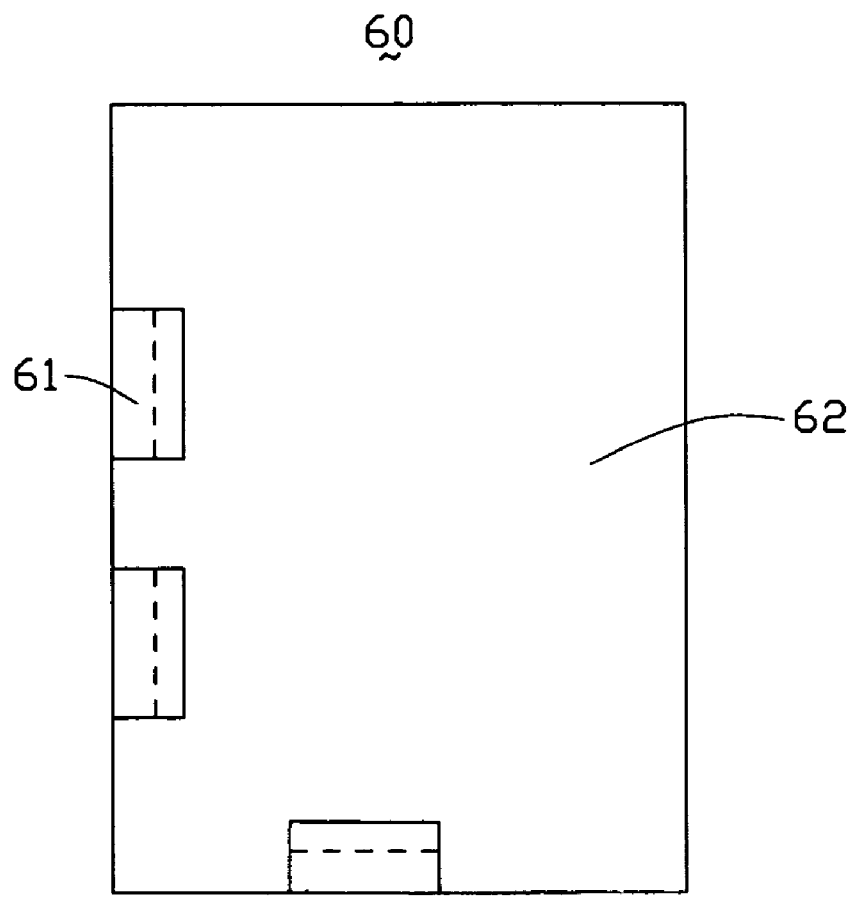
FIG. 5 is a schematic, top elevation of a conventional polarizer aligning device.
Figure 6:
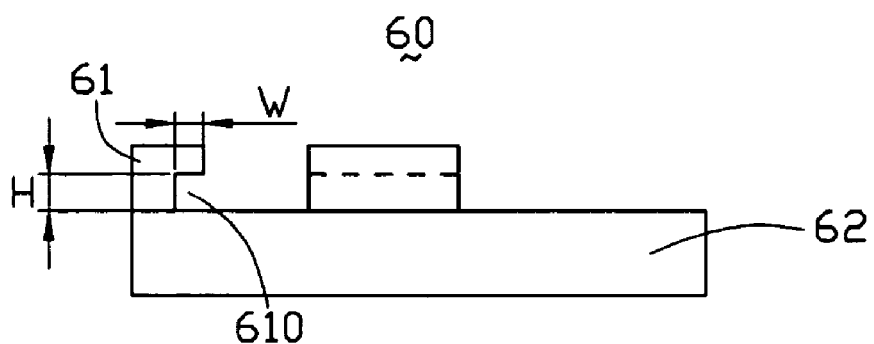
FIG. 6 is an end elevation of the polarizer aligning device of FIG. 5.

Referring to FIG. 3 and FIG. 4, these show how to use the attaching apparatus 10 to attach a polarizer 6 onto an LCD panel 7. The LCD panel 7 is already bonded on a flexible printed circuit (FPC) board (not shown). Firstly, the sliding bracket 50 is moved to the left of the guiding bracket 30, whereby the first table 32 faces the second table 430 unobstructed by the sliding bracket 50. A vacuum pump (not shown) is turned on. Secondly, the second table 430 is turned over to be face up, and the polarizer 6 is placed thereon. The polarizer 6 is adjusted and aligned by the two locators 440, 450, and is secured on the second table 430 by reason of the suction holes 434 communicating with the vacuum pump. Thirdly, the LCD panel 7 is placed in the first space 322. The LCD panel 7 is adjusted and aligned by the two locators 323, and is secured in the first space 322 by reason of the grooves 324 communicating with the vacuum pump. Simultaneously, the FPC board is located in the second space 326. Fourthly, the second table 430 is turned over to be face down, in the position shown in FIG. 3. Fifthly, the sliding bracket 50 is pushed to the right end of the guiding bracket 30. Because the left portion of the polarizer 6 protrudes from the left end of the second table 430, when the roller 523 rolls on the polarizer 6, the polarizer 6 is pressed down and attached onto the LCD panel 7. The guiding surface 431 can prevent the roller 523 from interfering with the second table 430. In addition, because the walls surrounding the second space 326 are higher than those surrounding the first space 322, the height of the roller 523 is adjustable. The roller 523 cannot contact the FPC board in the second space 326, and the FPC board is protected from being pressed.

The attaching apparatus 10 can be readily adjusted to attach LCD panels and polarizers of various different sizes. Adjusting methods are described as follows. When the size of the polarizer or the LCD panel is changed, the first locator 440 and the second locator 450 can be moved and fixed to appropriate places by engagement of the screws 46 in different of the screw holes 432, 433. To align the LCD panel with the new polarizer, the first table 32 can be adjusted by adjusting the engagement of the screw 332 in the screw hole 325. After the first table 32 is moved to an appropriate position, the screws 34 can be tightened to fix the first table 32 on the supporting plate 312. Then, the attaching apparatus 10 is ready for a new attaching process to be executed.

It is to be understood, however, that even though numerous characteristics and advantages of the preferred embodiment have been set forth in the foregoing description, together with details of the structure and function of the preferred embodiment, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An attaching apparatus for attaching an optical film to a workpiece, comprising:
    a base;
    a guiding bracket positioned on the base, wherein the guiding bracket comprises a first table defining a first space and a second space communicating with each other, and a supporting plate for movably positioning the first table thereon, the first table under the first space defining one or more suction holes;
    a pivot bracket comprising a support frame and a pivot device, wherein the support frame is positioned on the base near the guiding bracket, the pivot device comprises a connecting plate and a pivoting plate, the connecting plate is slantingly positioned on the support frame, the pivoting plate is pivotably connected to the connecting plate and comprises a second table and two locators movably positioned on the second table, and the second table defines one or more suction holes; and
    a sliding bracket slidably engaged with the guiding bracket.

2. The attaching apparatus as recited in claim 1, wherein the supporting plate defines a screw hole, the first table defines a slot corresponding to the screw hole of the supporting plate, and a screw extends through the slot and is engaged in the screw hole for limiting movement of the first table along the supporting plate.

3. The attaching apparatus as recited in claim 2, wherein the guiding bracket further comprises an adjusting device used for adjusting a position of the first table relative to the supporting plate.

4. The attaching apparatus as recited in claim 1, wherein walls of the first table surrounding the first space are higher than walls of the first table surrounding the second space, and the second space is deeper than the first space.

5. The attaching apparatus as recited in claim 1, wherein a sloped guiding surface is provided at one end of the second table that has the suction holes.

6. The attaching apparatus as recited in claim 1, wherein the second table defines two parallel rows of first screw holes and two parallel rows of second screw holes, the rows of first screw holes are perpendicular to the rows of second screw holes, and the locators define slots corresponding with the screw holes.

7. The attaching apparatus as recited in claim 1, wherein a top surface of the support frame is slanted.

8. The attaching apparatus as recited in claim 1, wherein a guide rod is positioned below the supporting plate.

9. The attaching apparatus as recited in claim 8, wherein the sliding bracket comprises a slider, a connecting device, an adjusting plate, and a plurality of springs, the slider is slidably engaged with the guide rod, and the connecting device is connected with the slider, the springs and the adjusting plate and can slide along the first table.

10. The attaching apparatus as recited in claim 9, wherein the connecting device comprises a roller, two connecting blocks, a plurality of connecting poles, and a plurality of fasteners, the roller is rotatably engaged in the connecting blocks, upper ends of the connecting poles are fixed to the connecting blocks, other portions of the connecting poles extend through the slider, the springs, and the adjusting plates, the fasteners are engaged on lower ends of the connecting poles, and the springs are compressed between the slider and the adjusting plate.

11. The attaching apparatus as recited in claim 1, wherein the second table has a handle used for operation thereof.

12. The attaching apparatus as recited in claim 1, wherein the sliding bracket has a handle used for operation thereof.

13. An attaching apparatus for attaching a first optical piece to a second optical piece, comprising:
 a base;
 a pivot bracket positioned on the base, comprising a first table which defines a first adjustable space for receiving the first optical piece;
 a guiding bracket positioned on the base, and comprising a second table which is slightly lower than the first table, the second table comprising a stepped sidewall, a second adjustable space for receiving the second optical piece, and a roller adapted to roll along the second adjustable space.

14. The attaching apparatus as recited in claim 13, wherein the first table comprises a sloped guiding surface at one end thereof, and the sloped guiding surface can be positioned near the second table.

15. The attaching apparatus as recited in claim 13, wherein the first table and the second table each comprise adjustment means for adjusting the respective first or second optical piece thereon.

16. The attaching apparatus as recited in claim 13, wherein the first table and the second table each comprise a holding device for holding the respective first or second optical piece thereon.

17. The attaching apparatus as recited in claim 13, wherein the guiding bracket further comprises a third supporting plate, the second table is movably positioned on the third supporting plate, the second table below the second adjustable space defines one or more suction holes, the first table comprises two locators movably positioned thereon, and the first table defines one or more suction holes.

18. An attaching apparatus for attaching a first optical piece to a second optical piece, comprising:
 a base;
 a bracket positioned on the base, comprising a first table which defines a first adjustable space for receiving the first optical piece;
 a guiding bracket positioned on the base, and comprising a second table which is slightly lower than the first table, the second table comprising a stepped sidewall, a second adjustable space for receiving the second optical piece, and a roller adapted to roll along the second adjustable space; wherein
 said first table is angled with the second table, and both said first table and said second table are perpendicular to a common vertical plane which extends in a front-to-back direction along a moving direction of said roller.

19. The apparatus as recited in claim 18, wherein a guiding surface is formed on an undersurface of the first table and parallel to the second table.

* * * * *